(No Model.)
W. W. COLE.
HORSE CLEANER.
No. 463,942.      Patented Nov. 24, 1891.
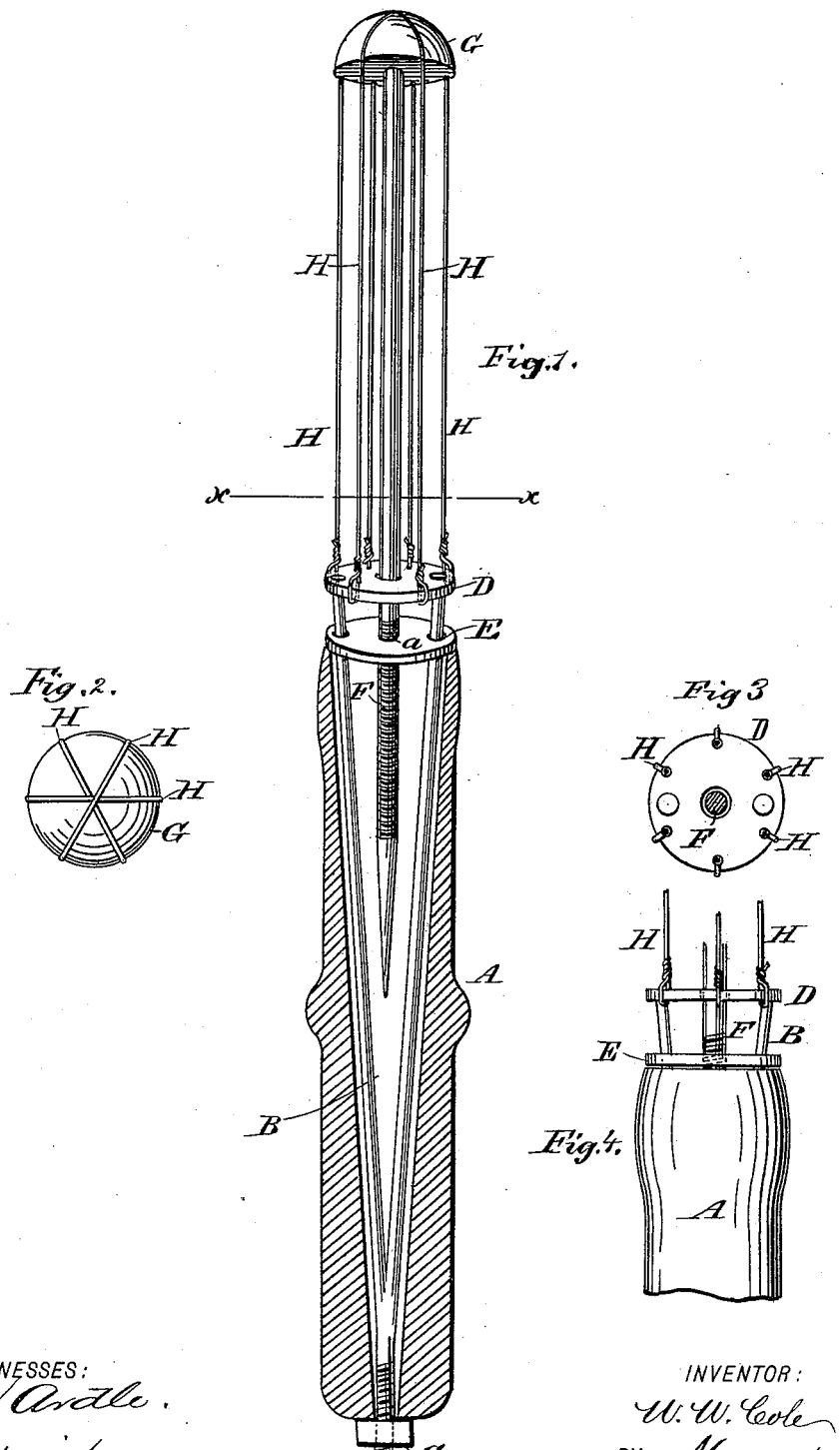
WITNESSES:
F. McArdle.
C. Sedgwick.
INVENTOR:
W. W. Cole
BY Munn & Co.
ATTORNEYS

UNITED STATES PATENT OFFICE.

WILLIAM W. COLE, OF EUDORA, KANSAS.

HORSE-CLEANER.

SPECIFICATION forming part of Letters Patent No. 463,942, dated November 24, 1891.

Application filed April 18, 1891. Serial No. 389,403. (No model.)

*To all whom it may concern:*

Be it known that I, WILLIAM W. COLE, of Eudora, in the county of Douglas and State of Kansas, have invented a new and Improved Horse-Cleaner, of which the following is a specification, reference being had to the annexed drawings, forming a part thereof, in which—

Figure 1 is a perspective view, partly in section, of my improved horse-cleaner. Fig. 2 is a plan view. Fig. 3 is a transverse section taken on line $x\ x$ in Fig. 1, and Fig. 4 is a side elevation of the tension device.

Similar letters of reference indicate corresponding parts in all the views.

The object of my invention is to construct a simple and effective implement for cleaning horses, the same to be used in place of the usual curry-comb.

My invention consists in a frame carrying wires under adjustable tension and provided with a suitable handle, by means of which the implement may be applied to a horse.

In the handle A is inserted a forked rod B, which is threaded at one end and provided with a nut C. The ends of the arms of the forked rod project beyond the end of the handle A and are riveted or otherwise secured in the disk D. Upon the arms of the forked rod B is placed a perforated disk E, having a central screw-threaded aperture $a$, in which is inserted the threaded end of the rod F. The opposite end of the rod F is provided with a hemispherical head G, which is provided with transverse grooves for receiving the wires H, which pass over the head and through equidistant apertures in the disk D, and are twisted together, as shown. By turning the nut C the forked rod B is drawn into the handle, thereby drawing the disk D away from the hemispherical head G, thus producing any desired tension upon the wires H.

The implement is applied to a horse by grasping the handle A in both hands and rubbing the wires H along the skin of the horse in one direction or the other, or in both directions in alternation, as circumstances may require, thus loosening the dandruff and dirt. The implement may also be used for smoothing the horse's coat and for removing foam, sweat, and mud.

Having thus described my invention, I claim as new and desire to secure by Letters Patent—

1. An improved horse-cleaner consisting of a handle, a rod extending in alignment therewith and having an enlarged head, a series of wires applied to said head and arranged around said rod parallel thereto and attached to a sliding disk, and an adjustable straining device connected with the handle and disk, whereby the wires are drawn and held taut, substantially as shown and described.

2. In a horse-cleaner, the combination of the handle A, the threaded forked rod B, provided with the nut C and perforated plate D, the disk E, having a threaded central aperture $a$, the rod F, provided with the hemispherical head G, and the wires H, attached to the disk D and extending over the hemispherical head G, substantially as described.

WILLIAM W. COLE.

Witnesses:
CHRISTIAN KOHLER,
JAMES F. ROE.